United States Patent [19]
Mojden et al.

[11] Patent Number: 5,318,166
[45] Date of Patent: Jun. 7, 1994

[54] AIR HOLD UP ASSEMBLY FOR A STICK OF CAN ENDS

[75] Inventors: Andrew E. Mojden, Hinsdale; Richard P. Hoinacki, Oak Lawn, both of Ill.

[73] Assignee: Fleetwood Systems, Inc., Countryside, Ill.

[21] Appl. No.: 56,317

[22] Filed: Apr. 21, 1993

[51] Int. Cl.[5] .............................................. B65G 47/22
[52] U.S. Cl. ................................................. 198/493
[58] Field of Search .............................. 198/380, 493

[56] References Cited

U.S. PATENT DOCUMENTS

| | | | |
|---|---|---|---|
| 2,772,792 | 12/1956 | Lakso | 198/493 X |
| 4,530,632 | 7/1985 | Sela | 198/493 X |
| 4,742,669 | 5/1988 | Mojden | 53/500 |
| 4,979,870 | 12/1990 | Mojden et al. | 414/788.4 |
| 5,119,617 | 6/1992 | Mojden et al. | 53/500 |

FOREIGN PATENT DOCUMENTS

| | | | |
|---|---|---|---|
| 0177411 | 12/1961 | Sweden | 198/493 |
| 1411228 | 7/1988 | U.S.S.R. | 198/493 |
| 2081665 | 2/1982 | United Kingdom | 198/493 |

Primary Examiner—James R. Bidwell
Attorney, Agent, or Firm—Trexler, Bushnell, Giangiorgi & Blackstone, Ltd.

[57] ABSTRACT

Article hold up apparatus is provided for use with an elongate lane for transporting a plurality of articles received in a facewise nested condition from a first location at one end of the lane along the lane until a leading end of the articles reaches an opposite end of the lane, for retaining a leading one of the articles in a substantially coaxial facewise nested orientation with respect to the others of the articles for thereby retaining the articles being transported along the lane substantially in a facewise nested condition. The article hold up apparatus comprises air directing structure extending substantially the length of the elongate lane for directing air in a direction generally opposite a direction of travel of the articles along the lane.

10 Claims, 3 Drawing Sheets

AIR HOLD UP ASSEMBLY FOR A STICK OF CAN ENDS

BACKGROUND OF THE INVENTION

This invention is directed generally to the article handling arts and more particularly to a novel and improved article hold up apparatus for maintaining a group of articles in a facewise nested condition as the articles are transported along an elongate lane.

While the apparatus of the invention may find utility in other applications, the disclosure will be facilitated by particular reference to the handling of can ends during their fabrication and/or subsequent use as closures for can bodies. In the manufacture and filling of containers such as beverage cans or the like, a great number of can end parts are required. Modern fabrication and filling operations require that can ends be provided at a high rate of speed in a more or less continuous process. A number of individual processing steps are utilized in fabricating the can ends prior to their eventual use as closures.

In this regard, the can ends are often packaged and shipped to the final end user, although in some instances, the fabricator may also be the end user. The fabrication of can ends requires a number of steps including initial stamping or formation of the ends from suitable aluminum or other material or blanks, the formulation of suitable scoring for a tear away top portion and application of a graspable tab, ring or the like, as well as the adding of suitable liner materials as may be required for various applications. Such liners may be required to effect "repair" or assure the integrity of the end after the scoring and tab applying operation, or may be required as a condition of packaging for various products.

In the can end fabricating operation, can ends are generally fed from one station to the next in a more or less continuous flow in an endwise or facewise stacked or nested condition. Where can ends are to be packaged for shipment to a final user and unpackaged by the final user, the ends are generally provided in stacks or "sticks" as they are called in the art, of a predetermined number or length of ends in facewise nested condition.

However, during the handling of ends between one station and another in a fabricating or filling process, many instances arise in which a leading end of a flow or stream of can ends must be introduced to a portion of the processing apparatus. That is, a discontinuity occurs in the otherwise continuous flow of can ends. When such a discontinuity occurs, some means must be provided to assure that leading ones of the ends in the incoming stream are maintained in an upright coaxial or nested condition with the following ends. In such apparatus, the ends are often fed into an elongate lane which essentially comprises a pair of support rails which are spaced to engage spaced apart points about the bottom part of the circumference of the ends. These support rails are generally below center with respect to the circumferences of the ends. Sometimes it is necessary to provide for access by other handling equipment for gripping or otherwise handling the ends about their peripheries in an over-center fashion. For example, such apparatus, generally referred to as "pick-and-place" devices are used in applications such as are shown for example in prior U.S. Pat. Nos. 4,979,870 and 5,119,617, both of which are commonly owned with this application.

While the apparatus of the present application may find other uses, reference is particularly directed to the automatic tray loading, unloading and storage system, and to the multi-lane infeed counter/bagger, shown respectively in the above-referenced two U.S. patents. In both of these apparatus, can ends must be introduced into elongate lanes as a preliminary to various handling steps, such that it is necessary to assure that the leading ends of a continuous flow of can ends being introduced into such lanes are maintained in an upright nested condition. Generally speaking, the prior art has utilized hold up means or apparatus in the form of one or more pairs of elongate flexible or resilient strips of rubber or rubber-like material, as shown for example in FIG. 2 of U.S. Pat. No. 4,742,669, which is also commonly owned herewith. In this regard, the present invention may also find application in the can end counting system, and particularly in the application shown in FIG. 2, of the aforesaid U.S. Pat. No. 4,742,669. In each of the above-referenced three U.S. patents, there occur instances in which the can ends are separated from a more or less continuous incoming flow into individual groups or sticks of a predetermined number or length. Therefore, a discontinuity occurs each time one of these groups or sticks is separated out or removed from the incoming flow and a new group or stick is to be formed from the incoming flow of ends.

Such rubber hold up strips generally run the entire length of the lane, until such point as some further handling equipment or hold up mechanism is encountered by the advancing ends. While this arrangement had found widespread acceptance, there remains room for improvement. For example, the hold up strips are subject to wear over a long period of use and must therefore be periodically inspected and replaced. Also, various coatings, lubricants or other materials which may be present, either in connection with coatings on the ends themselves or otherwise, tend to build up on these elongate strips over a period of time, also necessitating periodic inspection and cleaning or replacement thereof. One aim of the present invention is to eliminate the need for such periodic inspection and replacement of hold up strips, while yet providing a hold up or support function, that is, for maintaining the can ends in a facewise nested condition as they are introduced into an elongate lane.

OBJECTS AND SUMMARY OF THE INVENTION

Accordingly, it is a general object of this invention to provide a novel and improved article hold up apparatus, for use with an elongate lane for transporting a plurality of articles received in a facewise nested condition, for retaining a leading one of the articles in a substantially coaxial and facewise nested orientation with respect to the others of the articles for thereby retaining the articles being transported along the lane substantially in a facewise nested condition.

Briefly, and in accordance with the foregoing object, an article hold up apparatus in accordance with the invention is utilized with an elongate lane for transporting a plurality of articles received in a facewise nested condition from a first location at one end of the lane along the lane until a leading end of the articles reaches an opposite end of the lane. The article hold up apparatus retains a leading one of the articles in a substantially upright and nested condition with respect to the others of the articles thereby retaining the articles traversing the lane substantially in a facewise nested condition. The article hold up apparatus comprises air directing structure extending substantially the length of the elongate lane for directing a flow of air in a direction generally opposite the direction of travel of the articles along the lane.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

DETAILED DESCRIPTION OF THE ILLUSTRATED EMBODIMENT

Figure 1:
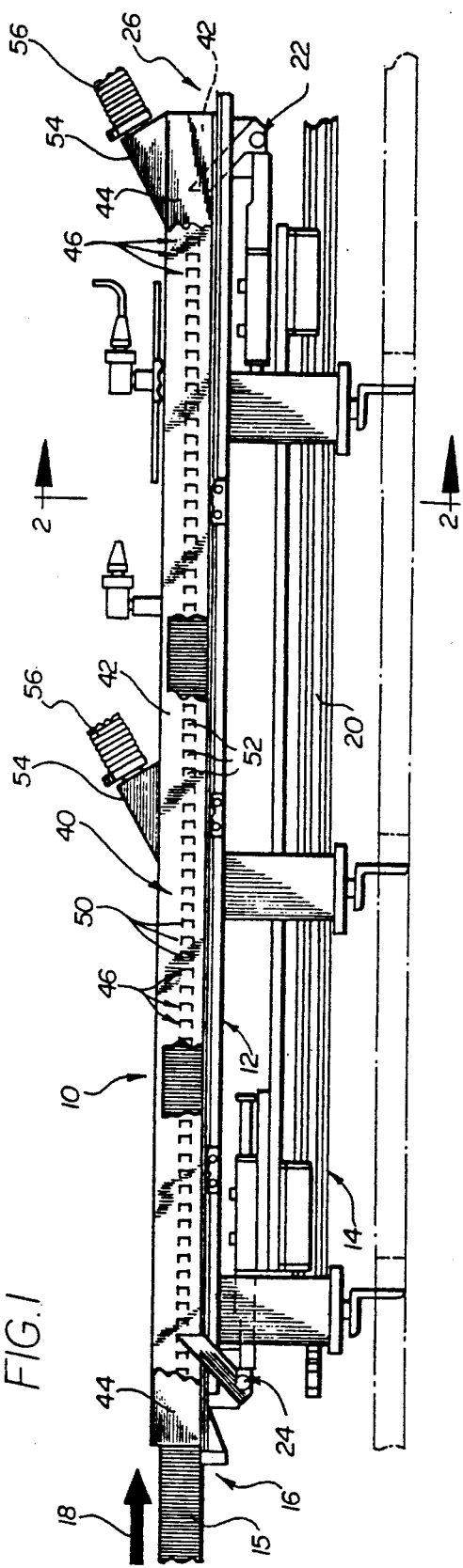
FIG. 1 is a side elevation of an infeed lane and associated infeed apparatus in connection with which an article hold up apparatus in accordance with the invention is advantageously utilized.
Figure 2:
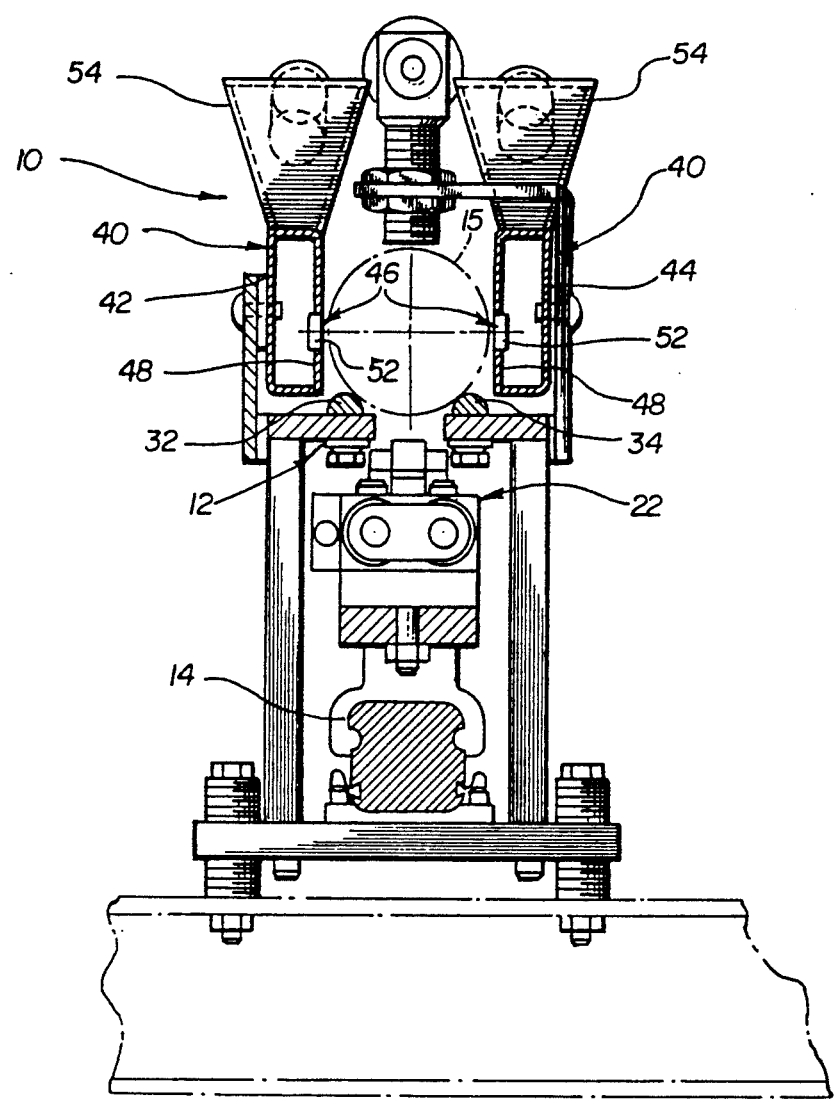
FIG. 2 is an enlarged sectional view taken generally in the plane of the line 2—2 of FIG. 1.

Referring now to the drawings, and initially to FIGS. 1 and 2, apparatus 10 in accordance with the invention is shown in connection with an infeed lane 12 and associated infeed apparatus 14. The infeed lane 12 may be generally of the type utilized as an infeed to a counter bagger apparatus of the type shown in the above-referenced U.S. Pat. No. 5,119,617 or to an automatic tray loading, unloading and storage system of the type shown in U.S. Pat. No. 4,979,870, or alternatively a lane of the type shown for example in the above-referenced FIG. 2 of U.S. Pat. No. 4,742,669. The illustrated infeed apparatus 14 is generally of the type shown in copending application Ser. No. 08/011,381 filed Nov. 13, 1992 which is commonly owned herewith and which forms an infeed apparatus for a system of the type shown in above-referenced U.S. Pat. No. 4,979,870.

Generally speaking, facewise nested can ends 15 are introduced into the lane 12 from one end 16 thereof as illustrated in FIG. 1, the direction of movement or flow of the can ends being indicated generally by the arrow 18. In the illustrated embodiment, the apparatus 14 associated with the infeed lane 12 comprises an elongate transport device or apparatus 20 having a leading end hold up member or device 22 and a trailing end hold up member or device 24. As is more fully described in the above-referenced copending application, to which reference is invited in this regard, the transport device 20 transports a group of can ends which has been separated out from the incoming flow or continuous stream of articles 15 and positioned in the infeed lane 12, from the infeed lane 12 to a down-stream lane or location coaxial therewith. Thus, as the transport device 20 removes a group of articles 15 from the infeed lane 12 (also in direction 18), a subsequent group of articles begins filling the lane 20 from its end 16.

It will be recognized that some means is required to maintain the leading end of the can ends 15 in an upright and nested condition as the can ends 18 are initially introduced into the lane 12. That is, the leading end hold up device 22 does not contact the leading end of the can ends 15 until it has almost reached the opposite or far end 26 of the infeed lane 12. In operation, the leading end hold up device 22 only supports leading end of the can ends 15 as they are transported away from the lane 12, in direction 18 past the end 26 of the lane 20. Moreover, as indicated above, and as more fully described in the above-referenced copending application, while transport device 20 is transporting a group of articles away from the lane 12, a subsequent group of articles 15 is being advanced into the infeed lane 12 at the end 16. Therefore, as described in the above-referenced copending application, hold up means in the form of at least one pair of elongate resilient or flexible rubber or rubber-like strips are disposed along the length of the lane 12 and to either side thereof for peripherally contacting and maintaining support for a leading end of the can ends 15 as they are introduced into the lane 12.

Figure 3:
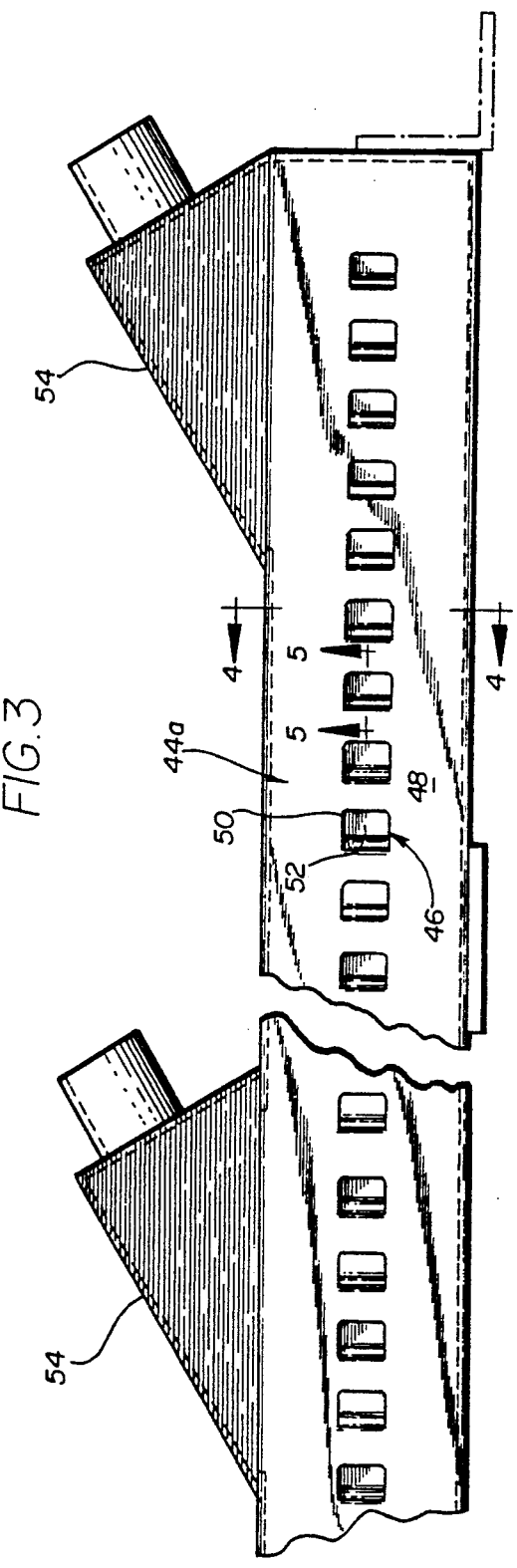
FIG. 3 is an enlarged partial view of a portion of the article hold up apparatus in accordance with one embodiment of the invention.
Figure 4:
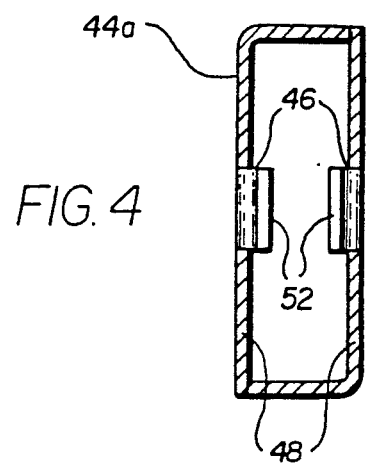
FIG. 4 is an enlarged partial sectional end view taken generally along the line 4—4 of the apparatus of FIG. 3.
Figure 5:
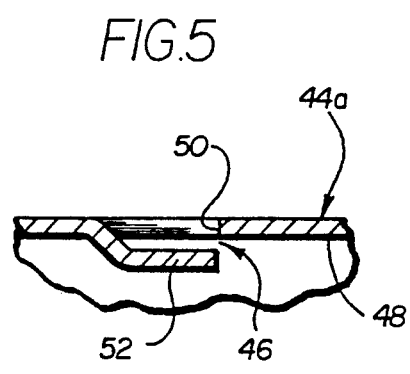
FIG. 5 is an enlarged partial sectional view taken generally along the line 5—5 of FIG. 3.

Departing from the prior art, and referring now also to FIGS. 3-5, the present invention provides a novel air hold up apparatus for the above-described purpose, thereby eliminating the elongate rubber strips of the prior art. As best viewed in FIG. 2, the infeed lane 12 comprises a pair of elongate parallel, spaced apart support members, guides or rails 32, 34. The spacing between the rails 32 and 34 is such as to provide support along a lower peripheral edge of the can ends 15 at points spaced approximately 90° apart.

In accordance with the invention, a novel air directing structure 40 is provided extending substantially the length of the lane 12 for directing a stream or flow of air in a direction generally opposite to the direction 18 of travel of the ends 15 along the lane 12. In the illustrated embodiment, this air directing structure 40 comprises a pair of elongate, generally tubular duct members 42, 44, each of which extends along one side of the elongate lane 12. Thus, the ducts 42 and 44 are generally aligned in parallel with each other and at opposite lateral sides of the ends 15 in the lane 12, as best viewed in FIG. 2.

In the illustrated embodiment, means are provided for defining a plurality of openings 46 in the ducts 42 and 44, which openings are configured for directing air generally in a direction opposite the direction 18 of travel of the articles or ends 15 along the lane 12. In the illustrated embodiment, the ducts 42 and 44 are generally rectangular in cross-section and the openings 46 are substantially equally coaxially spaced along the length of each duct 42, 44.

In the illustrated embodiment, the openings 46 comprise a plurality of lance members. That is, each of the openings 46 is formed by forming a generally U-shaped cut 50 in the side wall 48 of the duct 42 or 44 and pressing the U-shaped segment 52 of material thus defined laterally inwardly of the side wall 48 of the duct, in such a manner that the surface of the U-shaped segment 52 of material lies in a plane generally parallel and spaced by a small distance from the inside surface of side wall 48 of the duct. Accordingly, the so-called lance members formed in this fashion direct a flow or stream of air generally opposite the direction of travel 18 of the ends 15 along the lane 12.

Figure 6:
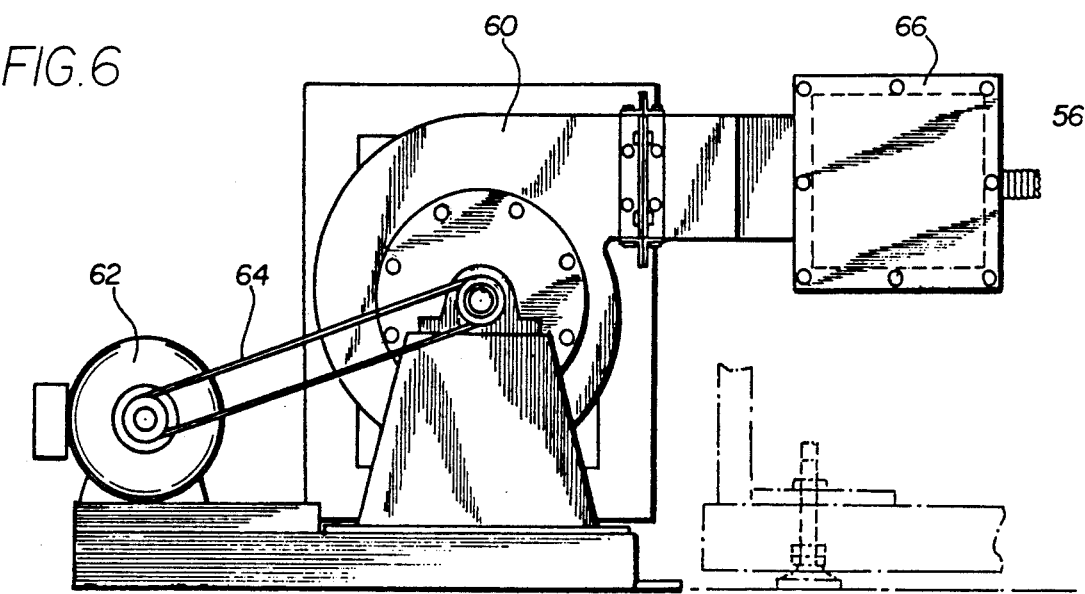
FIG. 6 is a side elevation of a blower and air distribution portion of the apparatus of the invention.
Figure 7:
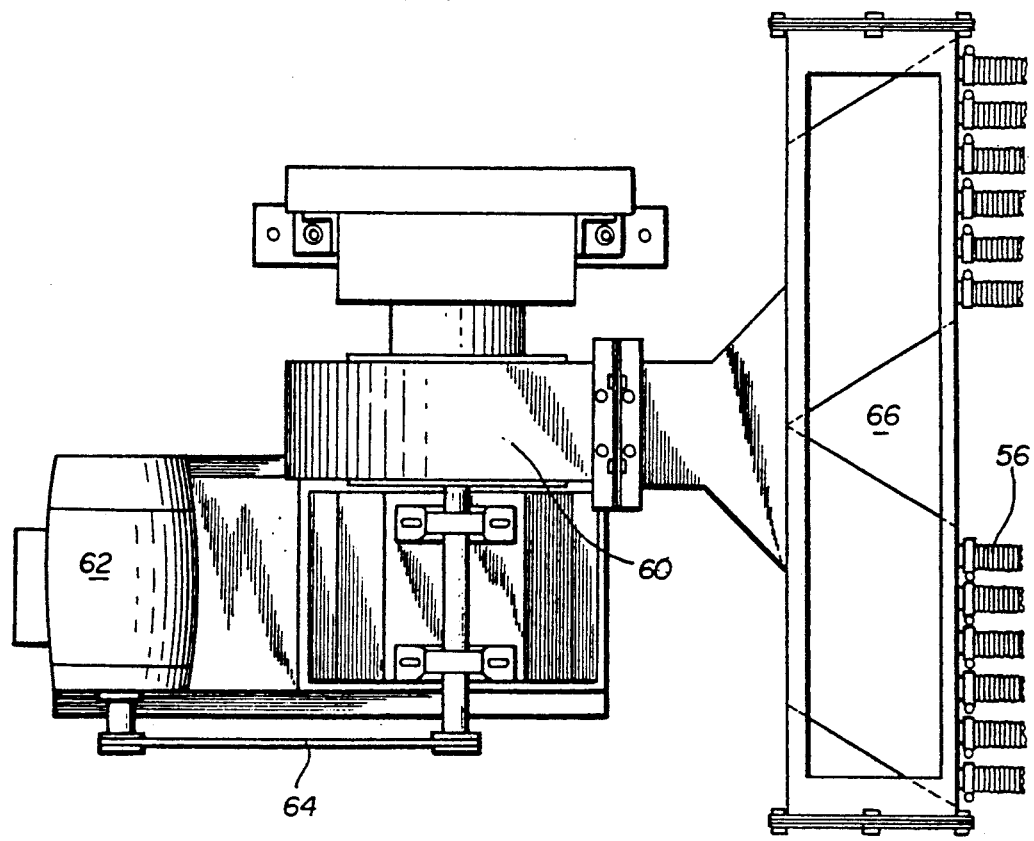
FIG. 7 is a top plan view of the apparatus of FIG. 5.

In the illustrated embodiment, each of the ducts 42 and 44 is provided with one, and preferably two fittings 54 spaced along the length thereof for delivering a flow of air thereto. Each of the fittings 54 is configured to receive a flexible conduit or hose 56 for delivering a flow or stream of air from a suitable source. One embodiment of a suitable air supply and delivery system is shown for example in FIGS. 6 and 7, to which reference is next invited. In FIGS. 6 and 7, a blower 60 operated by a motor 62 through a interconnecting belt drive 64 supplies a flow of air to an air distribution or directing structure including a manifold 66. The manifold 66 in turn distributes the flow of air to a plurality of individual delivery conduits 56 for feeding a plurality of points along the length of each of the ducts 42 and 44. In the embodiment illustrated a plurality of such conduits 56 emanate from the manifold 66 for feeding a plurality of ducts which are arranged for providing air hold up in accordance with the invention to a plurality of lanes similar to lane 12 which are arranged in a generally parallel, side-by-side orientation.

It will further be noted that in the embodiment illustrated in FIGS. 3 and 4, each of the ducts 42, 44 is provided with similar openings or lances 46, on both of its opposite side walls in order to simultaneously direct air toward each of a pair of lanes such as the lane 12 which are arranged in a parallel side-by-side condition. Such a duct may find utility in situations in which insufficient space may be available between closely adjacent parallel lanes for providing separate ducts. Thus, for example "outside" ducts in such an application FIG. 2 may have openings 46 to only one side, namely the side facing outermost lanes, whereas the "interior" or "between lanes" ducts may have openings to both sides, one side facing each of a pair of immediately adjacent, similar lanes.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. Article hold up apparatus, for use with an elongate lane for transporting a plurality of articles received in a facewise nested condition from a first location at one end of said lane along the lane until a leading end of said articles reaches an opposite end of said lane, for retaining a leading one of said articles in a substantially coaxial facewise nested orientation with respect to the others of said articles for thereby retaining the articles being transported along said lane substantially in said facewise nested condition, said article hold up apparatus comprising: air directing structure extending substantially the length of said elongate lane for directing air in a direction generally opposite a direction of travel of said articles along said lane; said air directing structure comprising at least one elongate tubular duct spaced from said lane and extending longitudinally along a substantial portion of the length of said lane and having a plurality of air directing means for directing air in said direction opposite said direction of travel of said articles.

2. Apparatus according to claim 1 and further including blower means for supplying a stream of air, and air delivery means for delivering said stream of air from said blower means to said directing means.

3. Apparatus according to claim 1 wherein said air directing structure comprises a pair of elongate, generally tubular ducts, each duct of said pair of ducts extending along one side of said elongate lane for substantially the length thereof and said air directing means comprising a plurality of openings in said ducts configured for directing air in a direction generally opposite the direction of travel of said articles along said lane.

4. Apparatus according to claim 3 wherein said ducts are generally rectangular in cross-section and wherein said means defining openings comprises a plurality of substantially equally spaced, coaxially aligned lance members formed along the length of each said duct on a side thereof facing said lane.

5. Apparatus according to claim 4 wherein further substantially equally spaced, coaxially aligned lance members are formed on sides of each said duct facing oppositely from said side thereof facing said lane for simultaneously directing air toward a second similar elongate lane arranged in a parallel, side-by-side condition with said first-mentioned lane.

6. Apparatus according to claim 2 wherein said air delivery means comprises a manifold coupled with said blower means and a plurality of conduits for delivering air from said manifold to said air directing structure.

7. Apparatus according to claim 6 wherein said air directing structure comprises a pair of elongate, generally tubular ducts, each duct of said pair of ducts extending along one side of said elongate lane for substantially the length thereof and said air directing means comprising a plurality of openings in said ducts configured for directing air in a direction generally opposite the direction of travel of said articles along said lane.

8. Apparatus according to claim 7 wherein said hold up apparatus comprises a plurality of said pairs of ducts arranged adjacent a plurality of similar, parallel, side-by-side elongate lanes and wherein said plurality of conduits are operatively coupled for delivering air from said manifold to each of said ducts.

9. Apparatus according to claim 7 wherein said plurality of conduits are further operatively coupled for delivering air from said manifold to a plurality of locations along the length of each of said ducts.

10. Apparatus according to claim 8 wherein said plurality of conduits are further operatively coupled for delivering air from said manifold to a plurality of locations along the length of each of said ducts.

* * * * *